(12) United States Patent
Quoiani

(10) Patent No.: US 6,637,750 B2
(45) Date of Patent: Oct. 28, 2003

(54) ALTERNATIVE METALLIC SEALS

(75) Inventor: Roberto L. Quoiani, Dunfermline (GB)

(73) Assignee: FMC Technologies, Inc., Chicago, IL (US)

( * ) Notice: Subject to any disclaimer, the term of this patent is extended or adjusted under 35 U.S.C. 154(b) by 0 days.

(21) Appl. No.: 09/998,070

(22) Filed: Nov. 29, 2001

(65) Prior Publication Data

US 2002/0074740 A1 Jun. 20, 2002

(30) Foreign Application Priority Data

Dec. 20, 2000 (GB) ............................................. 0031154

(51) Int. Cl.[7] .............................................. E21B 33/128
(52) U.S. Cl. ...................... 277/339; 277/340; 277/607; 277/616; 277/637
(58) Field of Search ................................ 277/323, 327, 277/339, 340, 604, 607, 609, 616, 630, 637, 645, 331, 334, 646, 924; 166/208

(56) References Cited

U.S. PATENT DOCUMENTS

| | | | | |
|---|---|---|---|---|
| 266,848 A | * | 10/1882 | Lewis ........................ 277/337 |
| 1,485,275 A | * | 2/1924 | Koerber ................. 174/152 S |
| 1,840,312 A | * | 1/1932 | Dunmire ..................... 277/622 |
| 2,693,376 A | * | 11/1954 | Wurzburger ............... 285/341 |
| 3,472,520 A | * | 10/1969 | Burns .......................... 277/339 |
| 3,490,777 A | * | 1/1970 | Emmerson .................. 277/614 |
| 3,630,553 A | * | 12/1971 | Foulger ........................ 285/340 |
| 3,649,032 A | * | 3/1972 | Nelson ........................ 277/322 |
| 3,784,214 A | | 1/1974 | Tamplen |
| 4,330,144 A | * | 5/1982 | Ridenour ................. 285/382.5 |
| 4,361,335 A | | 11/1982 | Vinciguerra |
| 4,482,086 A | * | 11/1984 | Wagner et al. ............... 277/337 |
| 4,615,544 A | * | 10/1986 | Baugh .......................... 285/18 |
| 4,751,965 A | * | 6/1988 | Cassity ........................ 166/182 |
| 4,869,319 A | * | 9/1989 | Szymozak et al. .......... 166/115 |
| 5,240,263 A | * | 8/1993 | Nicholson .................... 277/614 |
| 5,476,271 A | * | 12/1995 | Hatting et al. .............. 277/511 |
| 5,988,276 A | * | 11/1999 | Oneal .......................... 166/118 |
| 6,182,755 B1 | * | 2/2001 | Mansure ..................... 166/180 |
| 6,325,392 B1 | * | 12/2001 | Halling ........................ 277/654 |

FOREIGN PATENT DOCUMENTS

| | | |
|---|---|---|
| GB | 662348 | 12/1951 |
| GB | 957720 | 5/1964 |
| GB | 1 326 754 | 8/1973 |

* cited by examiner

Primary Examiner—Anthony Knight
Assistant Examiner—Alison K. Pickard
(74) Attorney, Agent, or Firm—Henry C. Query, Jr.

(57) ABSTRACT

A metallic sealing element comprises a generally tubular body having first and second opposed ends and a center section which is located between the first and second ends. In use the sealing element is compressible to bring the first and second ends towards one another to cause a center section to bulge transversely and sealingly engage a co-operating sealing surface.

22 Claims, 3 Drawing Sheets

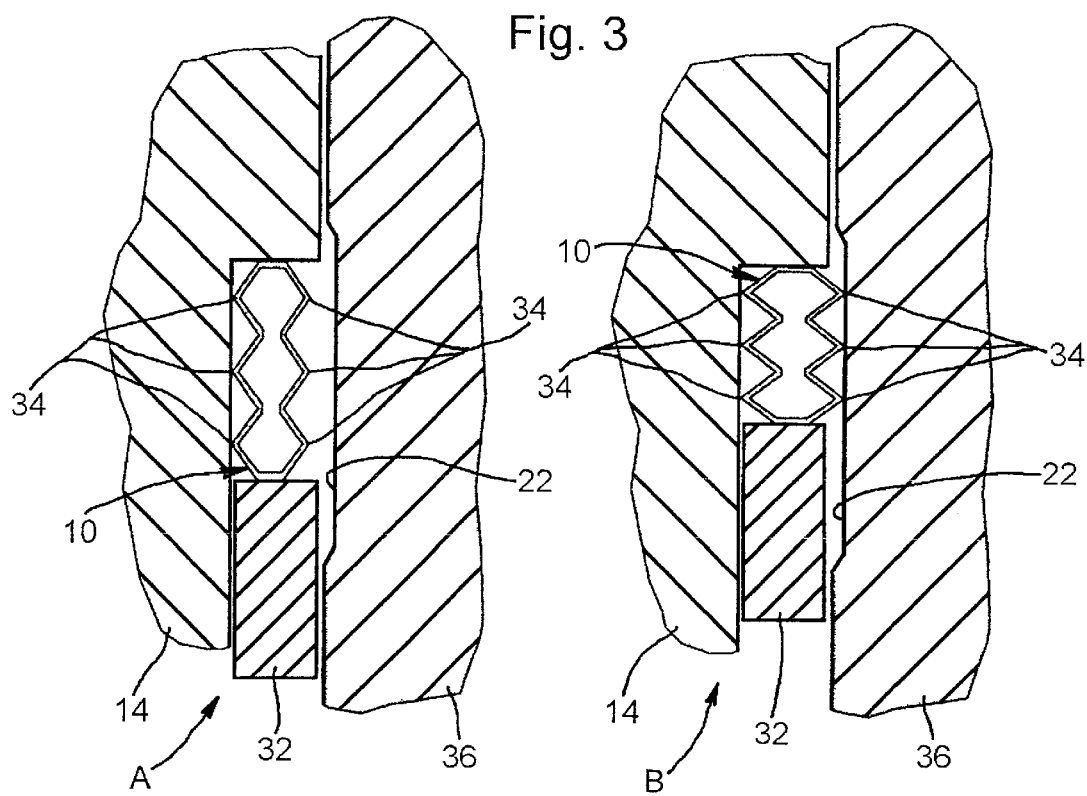

ALTERNATIVE METALLIC SEALS

BACKGROUND OF THE INVENTION

This invention relates to metallic seals and seal components which are energized in a novel manner, which are damage resistant and which can be made smaller than conventional metal-to-metal seals. Although for illustrative purposes the invention is discussed below largely in the context of completions for oil and gas wells, it is applicable to metallic seals in general.

There is a trend towards subsea completions incorporating increasingly large bores. Current subsea xmas tree system configurations (both parallel and concentric) can be inefficient in terms of space usage within the tubing hanger assembly. For large completion bore systems it would be advantageous to reconfigure the subsea xmas tree system whilst maintaining a large number of down-hole lines through the tubing hanger. A solution for releasing additional radial space to facilitate larger completion bores would be to reduce the size of the mechanism for sealing off the annulus void.

The design of large bore subsea xmas trees and completions is constrained due to requirements of utilizing existing standard BOP configurations. Therefore, in order to run larger completion tubing, space must be saved elsewhere to permit using existing BOP's. Additionally, particularly in the case of deepwater developments, significant cost savings can be achieved by using smaller standard BOP and casing programs while still maintaining—or increasing—the radial space available for the completion tubing. In this way vessel selection is made easier, and hence costs decreased, due to smaller handling requirements associated with the smaller BOP size.

The problematic situation of a drive toward larger bore completions coupled with potentially utilizing smaller BOP stacks makes the radial space taken within the well system for annular packoffs of prime importance. Any space saved here can have a direct impact on the size of the completion tubing that can be accommodated.

Essentially, the sealing requirement for a slick bore tubing hanger is to seal the annulus between the tubing hanger and spool (wellhead, xmas tree or tubing spool), maintaining a clearance while running in the hanger, and once the hanger is in position, energizing the seal to a set (sealed) condition. In the particular case of horizontal production outlet tubing hangers, it is usual to seal the annulus above and below the horizontal outlet. In the case of conventional tubing hangers (or casing hangers), only one seal barrier is required to seal off the annulus.

The prior art is replete with descriptions of seal systems involving a metal sealing element that bears against a metallic surface to establish a metal-to-metal sealing interface preventing the passage of corrosive or non-corrosive pressurized fluid throughout a wide temperature and pressure range. Packoffs providing metal-to-metal seals are disclosed for example in U.S. Pat. Nos. 4,900,041 and 5,174,376. Both patents disclose annular metal seal elements having a generally U-shaped cross-section. An energizing mandrel is driven downwardly between the two legs of the U-shaped seal profiles thereby deflecting the outer leg outwardly. However the energizing mandrel and its associated actuating mechanism is often relatively large, leading to a bulky packoff assembly. Furthermore, the range of movement imparted to the seal element outer leg by the mandrel is restricted, meaning that the sealing surface or area within the wellhead housing or other spool bore with which the seal element outer leg co-operates must closely surround the seal element in its relaxed or non-energized state. Such seal areas/surfaces therefore cannot be recessed for protection during drilling operations, so remaining exposed and vulnerable to damage.

SUMMARY OF THE INVENTION

In accordance with the present invention, a seal assembly comprises an annular sealing surface and a metallic sealing element comprising in an unenergized state a thin-walled, substantially cylindrical tube or sleeve having first and second opposed ends, the sealing element in use being compressed so as to move the opposed ends towards one another, such movement causing a center section of the sealing element between the ends to bulge transversely of their direction of relative movement and sealingly engage the sealing surface. By this means relatively large deflections of the element center section can be obtained.

Such a sealing element has a wide variety of applications. It may be used to seal between a bore and a member, such as a shaft, received within the bore to isolate pressure in either direction across the sealing element.

To permit the necessary kinking and bulging, the length to wall thickness ratio of the tube is preferably greater than about 4. However, to avoid unstable or asymmetric buckling, the length to diameter ratio of the tube should not be too great, preferably no larger than about 2.5. A preferred length to wall thickness ratio is about 15. The particular dimensions most appropriate to a given sealing application will vary from case to case and can be determined experimentally. The sealing element may also include geometrical features that initiate the kinking and bulging in the required manner. For example, in the case of a generally tubular sealing element, the end faces may be shaped so as to produce higher compressive loading near the bore than towards the circumference of the sealing element. Additionally or alternatively, the bore may be widened towards the center section of the sealing element.

The invention also provides a metallic sealing element comprising a hollow center section whose interior is filled with a relatively easily deformable, relatively incompressible substance, the center section comprising walls of V-shaped cross-section or of concertina or bellows-shaped cross-section; the sealing element comprising first and second opposed ends which in use are compressed so as to move towards one another, such movement causing the V-shaped or concertina or bellows-shaped center section walls to bulge transversely of the direction of relative movement of the ends and sealingly engage a co-operating sealing surface.

A seal assembly including the sealing element, a bore and a member received in the bore, may be formed in which the member and/or the bore comprise(s) a pair of bodies having respective faces against which the respective ends of the sealing element are received, the bodies being movable towards each other to cause the bulging of the sealing element center section. Such movement may be generated by any of the means used to actuate conventional metal-to-metal seals into the energized or set condition, for example weight applied to one of the bodies, adjustment nuts or similar wedging means, or hydraulic piston and chamber actuators.

The member or bore preferably comprises a recessed sealing surface with which the sealing element center section makes sealing contact. Because it is recessed, the sealing surface is protected against mechanical damage and erosion.

The invention is useful not only in sealing the tubing annulus of a well completion, but also annuli at other well tubulars, such as casing hangers. The member may therefore be a tubing or casing hanger carrying the sealing element, with the bore formed in a spool in which the hanger is landed. The faces referred to above may both be provided on the hanger, or alternatively one face may be provided on the hanger and the other on the spool.

The hanger may have a lockdown mechanism that is also arranged to cause the relative movement between the faces for energizing the sealing element. No separate sealing element energizing actuator is therefore necessary, leading to a particularly compact sealing assembly.

The sealing element center section, or the sealing surface with which it cooperates, may comprise an insert or coating of relatively soft metal, adapted to form a better seal.

In its preferred embodiments, the invention fulfils one or more of the following objectives:

1. It provides reliability under cyclical loading, with good protection of co-operating seal surfaces against erosion and accidental damage.
2. It can be remotely operated using simple tooling or simply set by tubular string weight and/or a hanger lockdown mechanism.
3. It accommodates 10,000 psi (69 MNm$^{-2}$) nominal maximum working pressure as a typical base case. However, a family of such sealing assemblies may be produced, also including, for example, members for 5,000 psi (35 MNm$^{-2}$), 15,000 psi (104 MNm$^{-2}$) and other applications as required.
4. It is effective over a temperature range of at least 0° F. to 250° F. (−17.8° C. to 121° C.) and preferably beyond at either end.
5. It provides a compact seal assembly.

These and other objects and advantages of the present invention will be made apparent from the following detailed description, with reference to the accompanying drawings.

BRIEF DESCRIPTION OF THE DRAWINGS

FIG. 3 is a diagram of a third embodiment of the invention, featuring a hollow-walled sealing element of concertina cross-sectional form shown in two different states.

DETAILED DESCRIPTION OF THE PREFERRED EMBODIMENTS

For xmas trees it is necessary to isolate the annuli between the respective casing strings and the tubing hanger. For slick bore applications radial space is at a premium whilst at the same time sealing surfaces require protection during the drilling and completion process. The preferred embodiments facilitate the sealing of the annuli against a recessed surface in a spool bore, e.g., in a wellhead housing or tubing spool, with the recess feature affording the seal bore some protection during drilling and completion. In the case of horizontal xmas trees, the recessed bore with the sealing surface for the tubing hanger will be in the tree. This design may therefore afford the tree drill-through capability.

Figure 1:
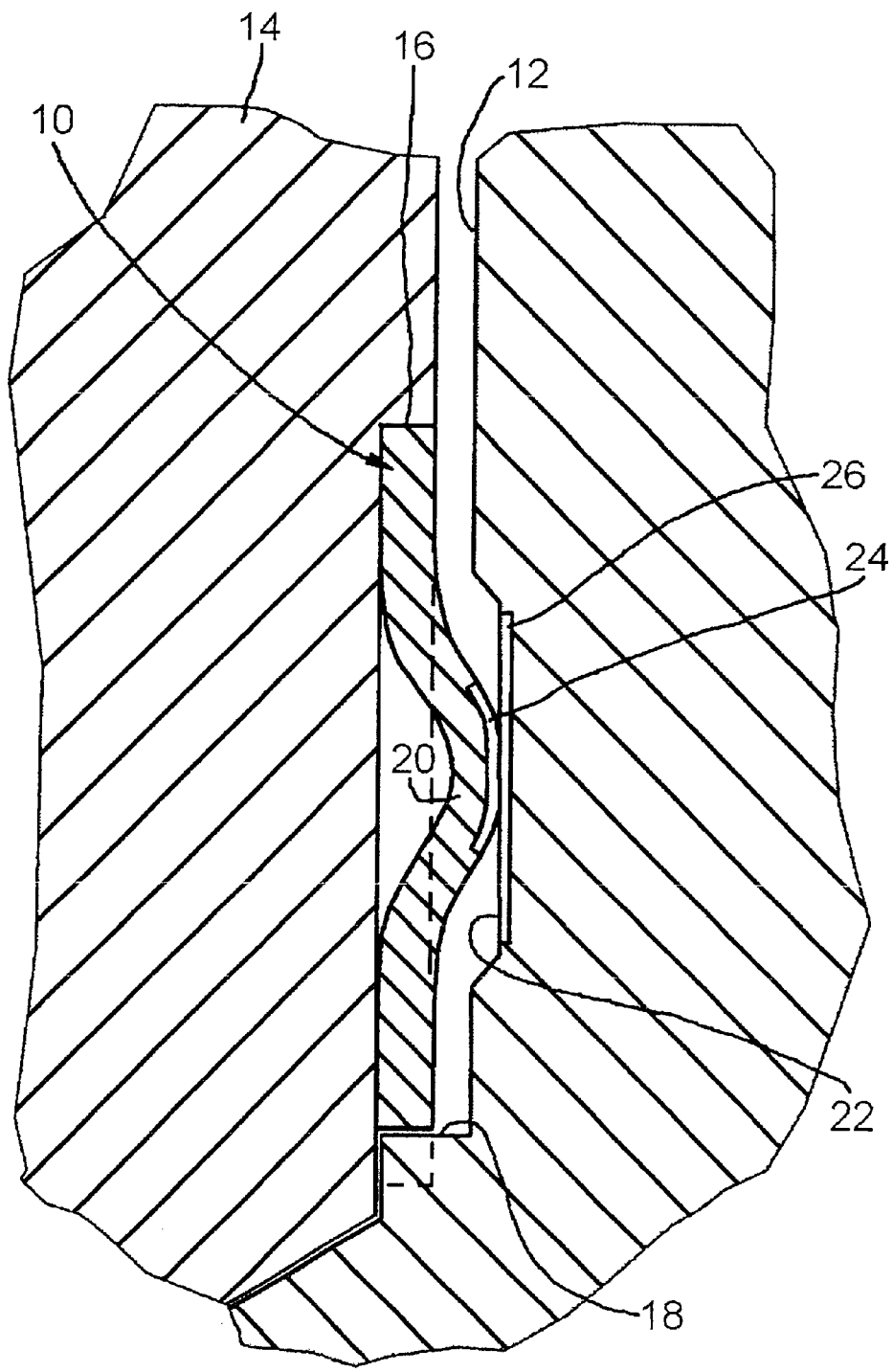
FIG. 1 is a diagram of a first embodiment of the invention, featuring a sealing element used to seal the annulus between a hanger and a surrounding spool.

The primary use of the sealing element shown in FIG. 1 may be between a tubing hanger and a spool. However it may be used anywhere in which an annulus between a bore and a member, such as a shaft received in the bore, needs to be isolated to contain pressure in either direction. The sealing element consists of a seal sleeve 10 which prior to being energized comprises a generally tubular body (dotted lines) of sufficiently small outside diameter to drift clear of the spool bore 12 during running. The upper end of the seal sleeve 10 as shown is sealingly engaged about a tubing or casing hanger 14 and butts up against a downwardly directed face 16 on the hanger 14. This seal may be achieved, for example, by an interference fit between the sleeve 10 and the hanger 14, by O-rings, packings or a sealing compound between these components, by a circumferential weld, or by a combination of such means. The seal sleeve 10 is energized by the application of an axial displacement. Landing the hanger 14 may cause that displacement (i.e., the sleeve 10 may be energized by tubing weight on the hanger landing shoulder 18, as shown), by mechanical means or by the application of hydraulic pressure to a chamber. A combination of the casing/tubing weight and a downward force exerted on the hanger 14 by a lockdown mechanism (not shown) may also be used to energize the sleeve 10. A central section 20 of the energized sleeve 10 forms a kink that is caused to bulge outwardly into sealing contact with a recessed sealing surface or area 22 provided in the spool bore 12. Additionally, soft metal inserts as indicated at 24 or 26 may be included to help effect a seal.

Figure 2:
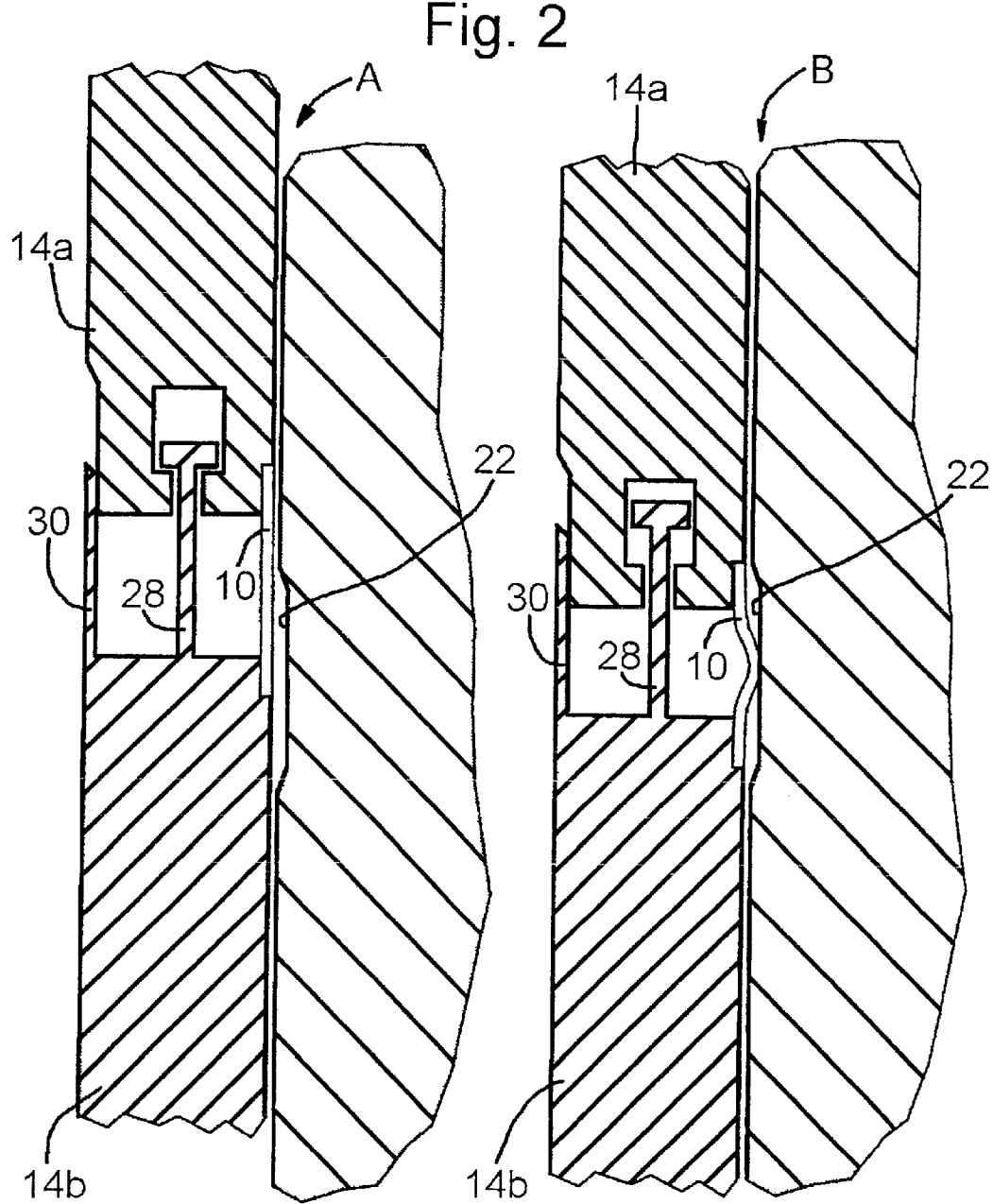
FIG. 2 is a diagram of a second embodiment of the invention, featuring a collapsible tubing hanger shown in two different states.

The embodiment of FIG. 2 operates in similar manner to that of FIG. 1. However in the FIG. 2 embodiment the tubing hanger has two interlinked parts 14a, 14b that are allowed to collapse telescopically from state A (shown on the left hand side of FIG. 2) to state B (shown on the right hand side of FIG. 2), causing the seal sleeve 10 center section to "bell-out" or bulge outwardly and seal against the recessed bore surface 22. Downward movement of the part 14a relative to the part 14b may be driven mechanically or hydraulically as before, including by means of the hanger lockdown mechanism and/or by the weight of the tubing or casing string if hung off the part 14a. A straight pull of the tubing hanger would straighten the sleeve section under the string weight if hung off the part 14b, restoring state A.

The two hanger parts are keyed together for limited relative axial movement by bolts or the like 28. The sliding joint so formed is provided with an inner cover 30. One or both of the ends of the sleeve 10 may be sealed to its respective hanger part 14a or 14b in a similar manner to the sleeve upper end of FIG. 1.

FIG. 3 shows a radial cross section through one side of a hollow walled sealing element 10 in a relaxed or un-energized state A (shown on the left hand side of FIG. 3) and an energized state B (shown on the right hand side of FIG. 3). The sealing element includes inner and outer walls that each comprise a concertina or bellows-type profile in cross section. An energizing mandrel 32 is used to crush the sealing element from the relaxed state A to the energized state B, causing the tips or ridges 34 of the concertina profiles to engage and seal against the hanger 14 and the recessed sealing surface 22. Alternatively, the energizing mandrel 32 may be replaced by a landing shoulder in the spool 36. Tubing/casing weight and hanger lockdown forces can then be used to crush the seal element 10, which expands to seal the annulus. A relatively easily deformable, relatively incompressible filler, such as a fluid, elastomer or soft metal, may be used within the hollow interior of the seal element 10 to provide support to the seal element 10 when subjected to pressure.

It should be recognized that, while the present invention has been described in relation to the preferred embodiments thereof, those skilled in the art may develop a wide variation of structural and operational details without departing from the principles of the invention. Therefore, the appended claims are to be construed to cover all equivalents falling within the true scope and spirit of the invention.

What is claimed is:

1. A seal assembly comprising an annular sealing surface and a metallic sealing element which comprises in an unenergized state a generally tubular cylindrical body having first and second opposed ends and a center section located between the first and second ends; the tubular cylindrical body comprising a length defined between the first and second ends and a wall having a wall thickness; the ratio of the length to the wall thickness being greater than about 4; and the sealing element in use being compressible so as to bring the first and second ends towards one another and thereby cause the center section to bulge transversely of the tubular cylindrical body and sealingly engage the sealing surface.

2. A seal assembly as defined in claim 1, wherein the ratio of the length to the wall thickness is about 15.

3. A seal assembly as defined in claim 1, wherein the tube comprises a length defined between the first and second ends and a diameter, and the ratio of the length to the diameter is less than about 2.5.

4. A seal assembly comprising:
a first member which includes a bore;
a second member which is received within the bore;
a sealing surface which is located on at least one of the bore and the second member;
a metallic sealing element which comprises in an unenergized state a generally tubular cylindrical body having first and second opposed ends and a center section located between the first and second ends;
the tubular cylindrical body comprising a length defined between the first and second ends and a wall having a wall thickness;
the ratio of the length to the wall thickness being greater than about 4;
the sealing element in use being compressible so as to bring the first and second ends towards one another and thereby cause the center section to bulge transversely of the tube and sealingly engage the sealing surface;
a first face which is formed on one of the first and second members;
a second face which is formed on one of the first and second members and which opposes the first face;
the first and second faces each being adapted to engage a corresponding first or second end of the tubular cylindrical body;
wherein relative movement of the first and second faces towards each other causes the bulging of the center section of the tubular cylindrical body.

5. A seal assembly as defined in claim 4, further comprising means for moving the faces towards each other.

6. A seal assembly as defined in claim 5, wherein the moving means comprises weight applied to at least one of the first and second members.

7. A seal assembly as defined in claim 4, wherein the sealing surface is located on a recessed surface that is formed in at least one of the bore and the second member.

8. A seal assembly as defined in claim 4, wherein the second member comprises a tubing or casing hanger on which the sealing element is supported and the first member comprises a spool in which the hanger is landed.

9. A seal assembly as defined in claim 8, wherein the hanger comprises the first and second faces.

10. A seal assembly as defined in claim 8, wherein the hanger comprises the first face and the spool comprises the second face.

11. A seal assembly as defined in claim 4, further comprising a relatively soft metal insert or coating supported on at least one of the center section and the sealing surface.

12. A metallic sealing element comprising:
first and second opposed ends and a hollow center section which is located between the first and second ends;
the center section comprising inner and outer walls each having a bellows-shaped cross-section;
wherein in use the first and second ends are movable relatively towards one another to cause the inner and outer walls to bulge and sealingly engage a co-operating sealing surface; and
a relatively easily deformable, relatively incompressible substance disposed in the hollow center section.

13. A metallic sealing element as defined in claim 12, wherein the first and second ends are connected to the inner and outer walls to form, in cross section, a closed curve.

14. A seal assembly comprising:
a first member which includes a bore;
a second member which is received within the bore;
a sealing surface which is located on at least one of the bore and the second member;
a metallic sealing element which comprises first and second opposed ends and a hollow center section which is located between the first and second ends;
the center section comprising inner and outer walls each having a bellows-shaped cross-section;
wherein in use the first and second ends are movable relatively towards one another to cause the inner and outer walls to bulge and sealingly engage the sealing surface;
a first face which is formed on one of the first and second members;
a second face which is formed on one of the first and second members and which opposes the first face;
the first and second faces each being adapted to engage a corresponding first or second end of the sealing element;
wherein relative movement of the faces towards each other causes the bulging of the center section of the sealing element; and
a relatively easily deformable, relatively incompressible substance disposed in the hollow center section.

15. A seal assembly as defined in claim 14, further comprising means for moving the faces towards each other.

16. A seal assembly as defined in claim 15, wherein the moving means comprises weight applied to at least one of the first and second members.

17. A seal assembly as defined in claim 14, wherein the sealing surface is located on a recessed surface that is formed in at least one of the bore and the member.

18. A seal assembly as defined in claim 14, wherein the second member comprises a tubing or casing hanger on which the sealing element is supported and the first member comprises a spool in which the hanger is landed.

19. A seal assembly as defined in claim 18, wherein the hanger comprises the first and second faces.

20. A seal assembly as defined in claim 18, wherein the hanger comprises the first face and the spool comprises the second face.

21. A seal assembly as defined in claim 14, further comprising a relatively soft metal insert or coating supported on at least one of the center section and the sealing surface.

22. A metallic sealing element as defined in claim 14, wherein the first and second ends are connected to the inner and outer walls to form, in cross section, a closed curve.

* * * * *